(12) United States Patent
Guo

(10) Patent No.: US 12,353,299 B2
(45) Date of Patent: Jul. 8, 2025

(54) BACKUP RECOVERY SYSTEM AND METHOD FOR ORACLE DATABASE

(71) Applicant: Aishu Technology Corp., Shanghai (CN)

(72) Inventor: Xiao Guo, Shanghai (CN)

(73) Assignee: AISHU TECHNOLOGY CORP., Shanghai (CN)

( * ) Notice: Subject to any disclaimer, the term of this patent is extended or adjusted under 35 U.S.C. 154(b) by 92 days.

(21) Appl. No.: 18/248,262

(22) PCT Filed: Mar. 1, 2021

(86) PCT No.: PCT/CN2021/078372
§ 371 (c)(1),
(2) Date: Apr. 7, 2023

(87) PCT Pub. No.: WO2022/088568
PCT Pub. Date: May 5, 2022

(65) Prior Publication Data
US 2023/0401128 A1    Dec. 14, 2023

(30) Foreign Application Priority Data
Oct. 30, 2020   (CN) .......................... 202011193776.1

(51) Int. Cl.
*G06F 11/00* (2006.01)
*G06F 11/14* (2006.01)
*G06F 16/21* (2019.01)

(52) U.S. Cl.
CPC ...... *G06F 11/1469* (2013.01); *G06F 11/1448* (2013.01); *G06F 11/1458* (2013.01); *G06F 11/1464* (2013.01); *G06F 16/211* (2019.01)

(58) Field of Classification Search
None
See application file for complete search history.

(56) References Cited

U.S. PATENT DOCUMENTS

| 10,210,048 | B2  |   | 2/2019 | Sancheti |
|------------|-----|---|--------|----------|
| 11,068,354 | B1  | * | 7/2021 | Ugur-Ozekinci ... G06F 11/1474 |

(Continued)

FOREIGN PATENT DOCUMENTS

| CN | 102012947 A | 4/2011 |
|----|-------------|--------|
| CN | 103853837 A | 6/2014 |

(Continued)

OTHER PUBLICATIONS

International Search Report and Written Opinion issued in related application Serial No. PCT/CN2021/078372 on Jul. 30, 2021.

(Continued)

*Primary Examiner* — Midys Rojas
(74) *Attorney, Agent, or Firm* — Mark H. Whittenberger; Holland & Knight LLP

(57) ABSTRACT

The present application relates to a backup and recovery system and method for an Oracle database. The system includes a server side, an agent client side, and an Oracle production environment; the agent client side is connected to the server side, and is installed in the Oracle production environment. The Oracle production environment is internally provided with a database and a recovery management (RMAN) tool that are connected in sequence; a storage unit is connected to the server side; the server side is configured to control a working state of the storage unit, send a backup task instruction or a recovery task instruction to the agent client side and receive an execution result returned by the agent client side; the agent client side executes corresponding processing on the Oracle production environment according to the instruction sent by the server side.

7 Claims, 3 Drawing Sheets

(56) References Cited

U.S. PATENT DOCUMENTS

2017/0116220 A1     4/2017   Wong et al.
2020/0042395 A1*   2/2020   Chu .................. G06F 16/24552

FOREIGN PATENT DOCUMENTS

| CN | 105389230 A | 3/2016 |
|---|---|---|
| CN | 107562575 A | 1/2018 |
| CN | 109325075 A | 2/2019 |
| CN | 110704242 A | 1/2020 |
| CN | 112214359 A | 1/2021 |

OTHER PUBLICATIONS

Lin, Yue-Xin, IT System Data Protection Practice Based on Copy Data Management Technique, 1994-2019 China Academic Journal Electronic Publishing House. http://www.cnki.net.
Jiangsu Cable Database Disaster Recovery Solution, DOI:10.16045/j.cnki.catvtec.2020.01.018.
First Office Action issued on Apr. 15, 2022 in related application Serial No. 202011193776.1.
Second Office Action issued on Nov. 8, 2022 in related application Serial No. 202011193776.1.

* cited by examiner

BACKUP RECOVERY SYSTEM AND METHOD FOR ORACLE DATABASE

RELATED APPLICATIONS

The subject application is a U.S. National Stage application of International Application No. PCT/CN2021/078372, filed on Mar. 1, 2021, which claims the benefit of Chinese Patent Application No. 202011193776.1, filed on Oct. 30, 2020. The contents of each application incorporated herein by reference.

This application claims priority to Chinese Patent Application No. 202011193776.1, filed with the China National Intellectual Property Administration (CNIPA) on Oct. 30, 2020, the disclosure of which is incorporated herein by reference in its entirety.

TECHNICAL FIELD

The present application relates to the technical field of data backup and recovery, for example, to a backup and recovery system for an Oracle database and a backup and recovery method for an Oracle database.

BACKGROUND

The conventional Oracle database backup is offline backup, also known as cold backup. Before the backup starts, the database must be completely shut down, and every file used by the database is required to be backed up.

In the 6th edition of Oracle database, a concept of online backup, that is, hot backup, was introduced. The hot backup is a method of backing up a database in an archive log manner when the database is running.

In the 8th edition of Oracle database, the recovery manager (RMAN) was introduced as a recommended backup manner for an Oracle database. The RMAN is tool software installed with Oracle server software. The RMAN can be used to back up and recover database files, archive log files and control files to perform full or partial database recovery. The RMAN uses the backup level to implement an incremental backup, and uses the incremental backup on the basis of a full backup to reduce the quantity to be backed up.

Backing up with the RMAN will generate a file in the format of backup set. The backup set is a compression format. One backup set file may contain multiple file contents. When backing up by using the backup set manner, the RMAN can skip empty data blocks, to reduce the size of the files to be baked up, and can reduce the size of the backup set file through an additional compression algorithm. Although the backup file generated by using the backup set manner is small in size and can save backup space, in recovering data, a Restore operation needs to be performed first, and then a decompression operation needs to be performed, which often leads to a significant extension of time in business data disaster recovery.

SUMMARY

A backup and recovery system and a backup and recovery method for an Oracle database are provided according to this application, which avoid the defects presented in the above-described related technologies, and can not only ensure full backup of data, but also can recover fast.

A backup and recovery system for an Oracle database is provided according to embodiments of the present application, which includes a server side, an agent client side and an Oracle production environment. The agent client side is connected to the server side, and the agent client side is installed in the Oracle production environment, the Oracle production environment is internally provided with a database and a recovery manager (RMAN) tool connected sequentially, a storage unit is connected to the server side, and the server side is configured to control a working state of the storage unit, to send a backup task instruction or a recovery task instruction to the agent client side, and to receive an execution result returned by the agent client side.

The agent client side is configured to execute corresponding processing on the Oracle production environment according to the backup task instruction or the recovery task instruction sent by the server side, and return an execution result to the server side.

The storage unit is connected to the RMAN tool through a corresponding mounted storage unit, and the mounted storage unit is configured to store an image copy of data backup or image copy of data recovery.

Optionally, the storage unit is connected to a corresponding mounted storage unit through a mounting link.

Optionally, the mounting link includes an internet small computer system interface (iSCSI) link and a fiber channel (FC) link.

A backup and recovery method for an Oracle database is provided according to embodiments of the present application, which includes a data backup process and a data recovery process.

The data backup process includes as follows.

A user creates a backup task, and a server side sends a backup task instruction to an agent client side according to a task configuration of the backup task.

The agent client side detects the state of the Oracle database and in response to that the of the Oracle database is detected to be normal, and according to the task configuration, the server side mounts a storage unit to the Oracle production environment through a mount link to obtain a mounted storage unit; and in response to that the state of the Oracle database is detected to be abnormal, the task is ended.

A storage formatting operation is performed on the mounted storage unit.

A data backup is performed on the basis of a recovery manager RMAN tool.

The mounted storage unit is demounted.

A cleanup operation is performed to end the backup process.

The data recovery process includes as follows.

The user creates a recovery task, and the server side sends a recovery task instruction to the agent client side according to a task configuration of the recovery task.

The agent client side detects whether the Oracle database is running, and in response to that the Oracle database is running, the task is ended, and in response to that the Oracle database is not running, and according to the task configuration, the server side mounts a storage unit to the Oracle production environment through a mounting link to obtain a mounted storage unit.

According to the task configuration, a password file is created, and a parameter file is generated or modified in sequence, and then data recovery is performed based on the RMAN tool.

After the data recovery is completed, a recovery result is checked, and in response to a checking result that the data recovery is successful, the database is opened, and the data recovery process is ended, and in response to a checking result that the data recovery is unsuccessful, the current database is shut down, and then the mounted storage unit is demounted and a cleanup operation is performed to end the data recovery process.

Optionally, the step that the agent client side detects the state of the Oracle database and in response to that the state of the Oracle database is detected to be normal, and according to the task configuration, the server side mounts a storage unit to the Oracle production environment through a mount link to obtain a mounted storage unit; and in response to that the state of the Oracle database is detected to be abnormal, the task is ended, includes as follows.

The agent client side checks whether the state of a database of an instance to be protected is Open, and in response that the state of the database of the instance to be protected is not Open, the task is ended; and in response to that the state of the database of the instance to be protected is Open, the agent client side checks whether the mode of the database of the instance to be protected is an archive mode, and in response to that the mode of the database of the instance to be protected is a non-archive mode, the task is ended, and in response to that the mode of the database of the instance to be protected is the archive mode, and according to the task configuration, the server side mounts the storage unit to the Oracle production environment by the mounting link to obtain a mounted storage unit.

Optionally, the step that the agent client side detects whether the Oracle database is running, and in response to that the Oracle database is running, the task is ended, and in response to that the Oracle database is not running, and according to the task configuration, the server side mounts a storage unit to the Oracle production environment through a mounting link to obtain a mounted storage unit, includes as follows.

The agent client side checks whether the database state is Open, and in response to that the database state is Open, which indicates that the Oracle database is running, the task is ended; and in response to that the database state is not Open, which indicates that the Oracle database is not running, and according to the task configuration, the server side mounts the storage unit to the Oracle production environment through a mounting link to obtain a mounted storage unit.

Optionally, the storage formatting operation is to format the mounted storage unit into a file system storage format or an ASM storage format according to different Oracle database construction modes.

Optionally, the performing data backup based on an RMAN tool includes as follows.

The RMAN tool acquires data to be backed up from the database.

Through using an image copy manner, the RMAN tool transfers the data to be backed up to the mounted storage unit.

The mounted storage unit synchronously shares received data to be backed up, to a storage unit.

Optionally, the data to be backed up include full backup data, incremental backup data and archive log backup data, and the full backup data include a parameter file, a control file, data files and an archive log file, the incremental backup data include incremental data, the control file and the archive log file, and the archive log backup data include the control file and the archive log file.

Optionally, the step that according to the task configuration, a password file is created, and a parameter file is generated or modified in sequence, and then data recovery is performed based on the RMAN tool, includes as follows.

According to the task configuration, a password file is created.

In response to a task which instructs to mount as a new instance, and according to a task configuration of the task and the parameter file in the data to be recovered, a new parameter file is generated, and in response to a task which instructs to perform browsing recovery based on an original instance, neither a new parameter file is generated nor the parameter file is modified.

Based on the RMAN tool, the image copy in the storage unit are first registered into the control file, and in response to a task which instructs to mount as a new instance, the data to be recovered are rapidly switched to the image copy in the mounted storage unit, and a Recover operation is then performed, and in response to a task which instructs to perform browsing recovery on the original instance, a Restore operation is performed first and then the Recover operation is performed.

Compared with related technologies, this application has the following characteristics.

1. This application has the storage unit of the server side mounted into the Oracle production environment to obtain the mounted storage unit as the destination for backup data storage. When using the RMAN tool for backup, the data can be directly written to the mounted storage unit, the integrity of data backup is effectively guaranteed. In addition, based on the RMAN tool, data backing up is performed by using the image copy manner, which can ensure the original formats of the data files so that there's no need to consider the file format issue. Each file is a copy of the file in the original format, which increases the flexibility of operation for subsequent data recovery, thereby improving the speed of data recovery.

2. This application has the storage unit of the service side mounted into the Oracle production environment, and the Oracle production environment can access the data to be recovered in the mounted storage unit during data recovery. When the backed-up data are mounted and recovered as a new instance, it is simply required to partially modify the parameter file, specify a new instance name and a new control file location, then use the RMAN tool to rapidly switch the data files to the image copy in the mounted storage unit, and then combine with the recover operation, the new instance may just be pulled up quickly; when a browsing recovery is performed for the original instance, a Restore operation is directly performed first, and then the Recover operation is performed, and there's no need to perform the decompression operation, which significantly shortens the data recovery time and improves the data recovery speed.

Figure 1:
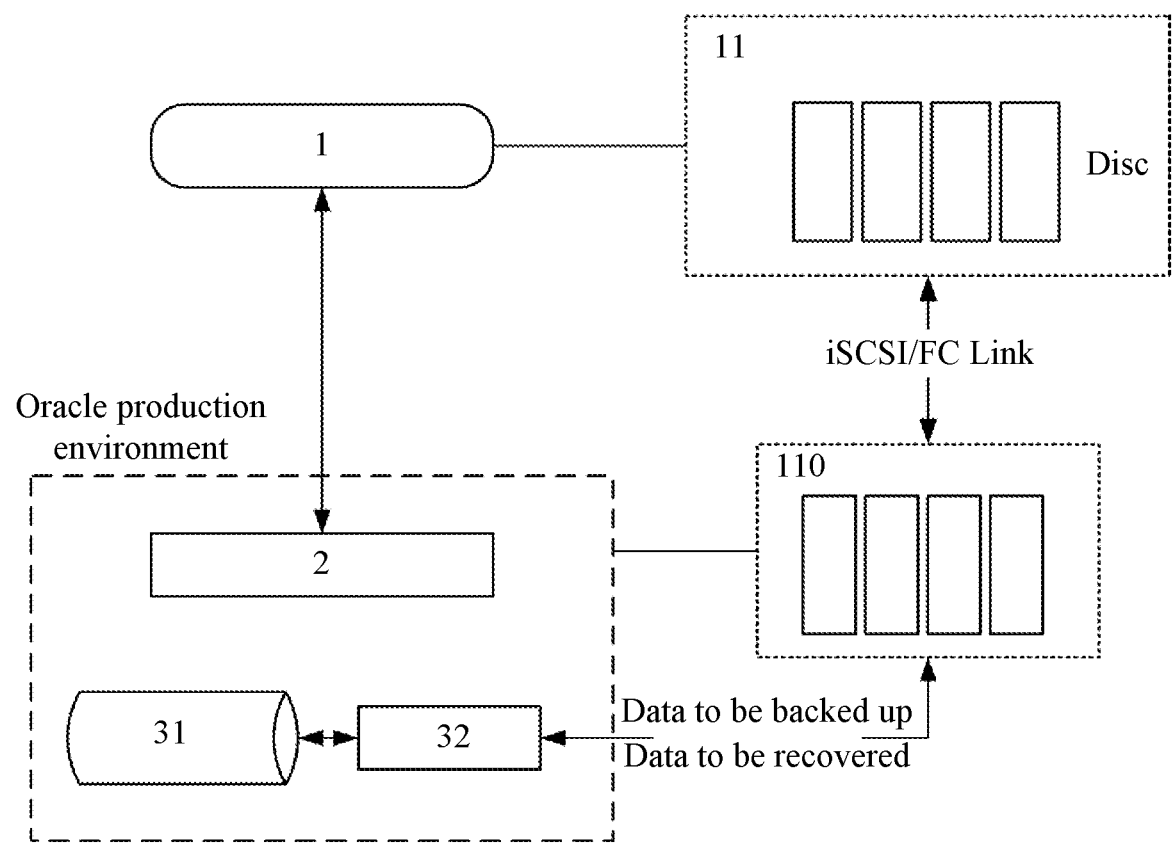
FIG. 1 is a schematic structural diagram of a system according to the present application.

Description of reference numerals in the drawings is as follows.

1 server side
2 agent client side
31 database
32 RMAN tool
11 storage unit
110 mounted storage unit

DETAILED DESCRIPTION

The present application is described in detail hereinafter in conjunction with the drawings and embodiments.

Embodiments

As shown in FIG. 1, a backup and recovery system for an Oracle database includes a server side 1, an agent client side 2 and an Oracle production environment, the agent client side 2 is connected to the server side 1, and the agent client side 2 is installed in the Oracle production environment. The Oracle production environment is internally provided with a database 31 and an RMAN tool 32 connected sequentially, a storage unit 11 is connected to the server side 1, and the server side 1 is configured to control the working state of the storage unit 11, to send a backup task instruction or a recovery task instruction to the agent client side 2, and to receive an execution result returned by the agent client side 2.

The agent client side 2 is configured to execute corresponding processing on the Oracle production environment according to the instruction sent by the server side 1, and return the execution result to the server side 1.

The storage unit 11 is connected to a corresponding mounted storage unit 110 through an internet small computer system interface (iSCSI) link and a fiber channel (FC) link, and then is connected to the RMAN tool 32 through the corresponding mounted storage unit 110, the mounted storage unit 110 is configured to store an image copy of data backup or an image copy of data recovery.

Figure 2:
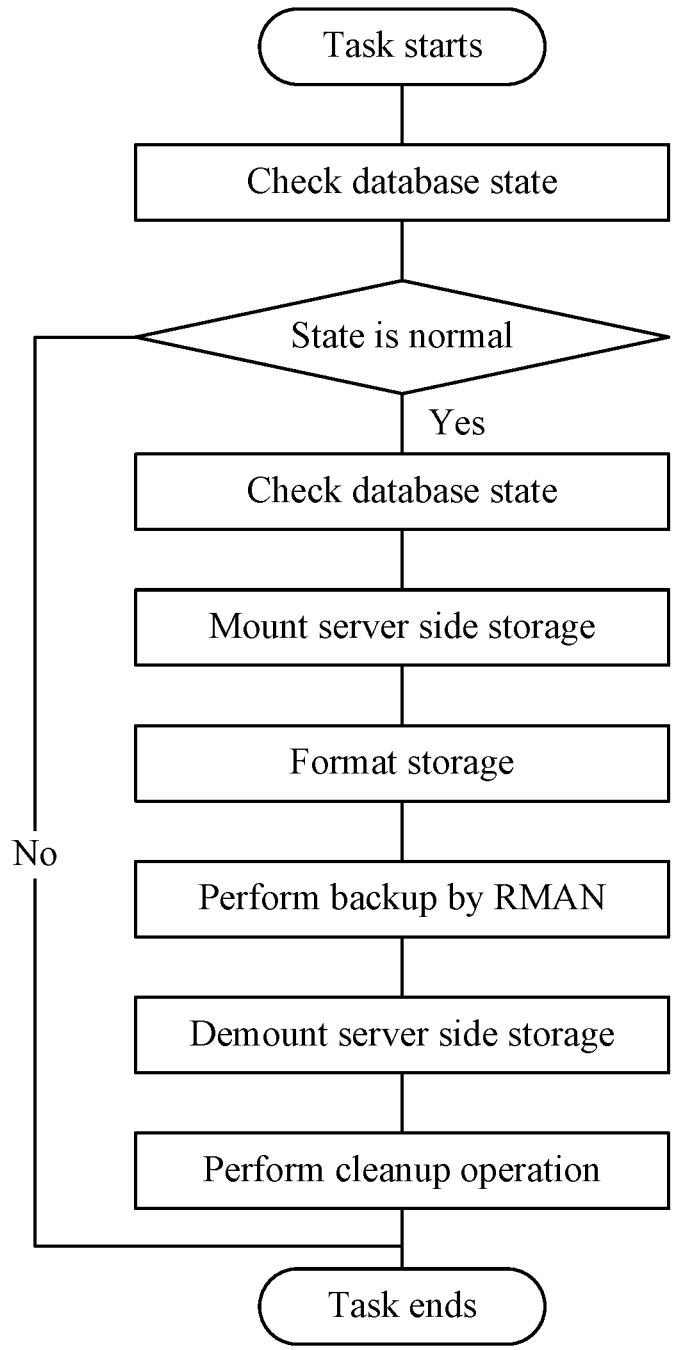
FIG. 2 is a schematic flow chart of data backup according to the present application.
Figure 3:
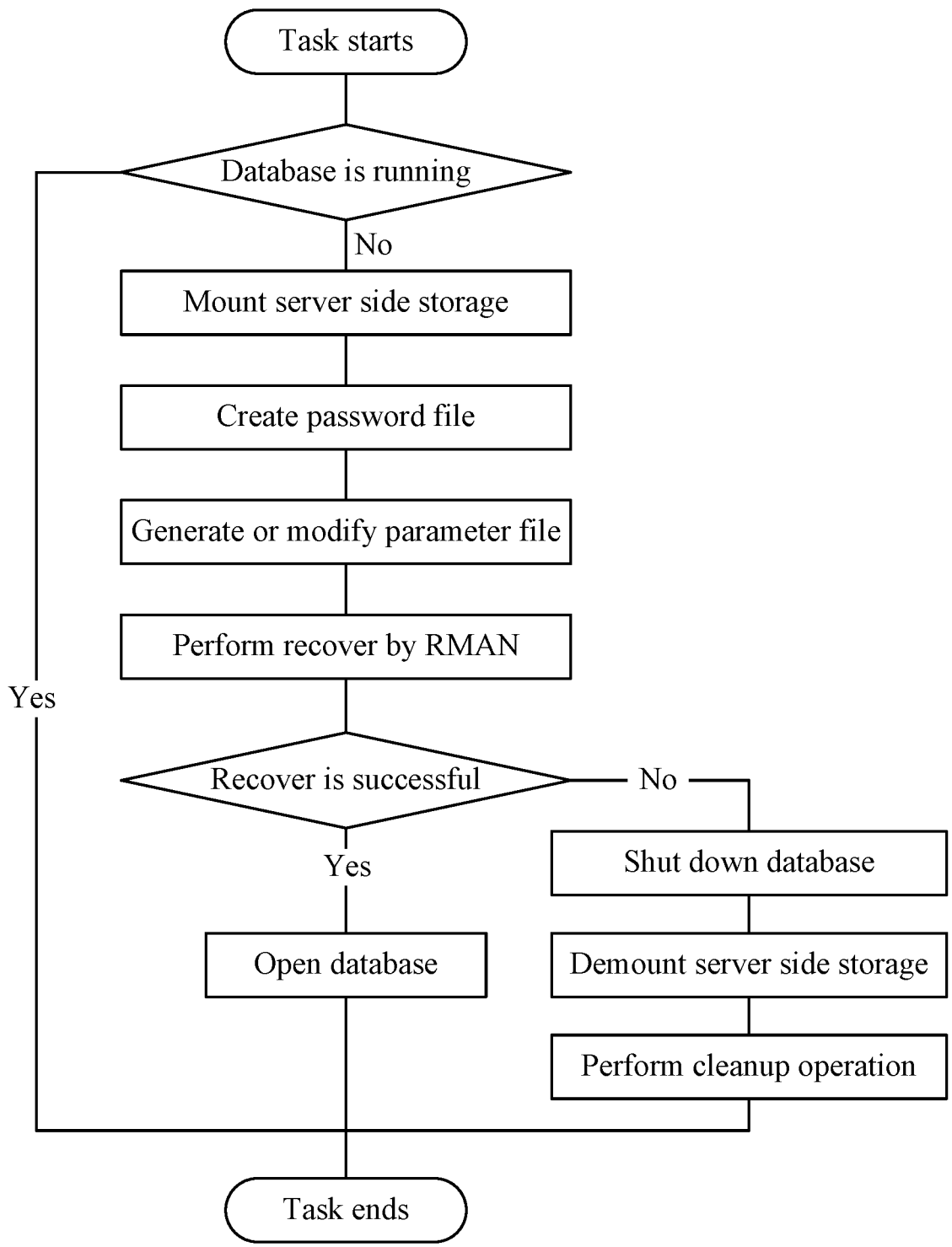
FIG. 3 is a schematic flow chart of data recovery according to the present application.

The workflows for data backup and data recovery based on the above system are shown in FIG. 2 and FIG. 3. In the process of data backup, steps A1 to A7 are mainly included.

In the step A1, a user creates a backup task, and the server side sends a backup task instruction to the agent client side according to a task configuration.

In the step A2, the agent client side checks the state of the Oracle database, and in a case where the Oracle database is detected to be normal, the step A3 is executed, and in a case where the Oracle database is detected to be abnormal, the task is ended.

In the step A3, according to the task configuration, the server side mounts the storage unit to the Oracle production environment through a mounting link to obtain the mounted storage unit.

In the step A4, a storage formatting operation is performed on the mounted storage unit.

In the step A5, data backing up is performed based on the RMAN tool.

In the step A6, the mounted storage unit is demounted.

In the step A7, a cleanup operation is performed and the backup process is ended.

The data recovery process mainly includes steps B1 to B7.

In the step B1, the user creates a recovery task, and the server side sends a recovery task instruction to the agent client side according to a task configuration.

In the step B2, the agent client side detects whether the Oracle database is running, and in a case where the Oracle database is running, the task is ended, and in a case where the Oracle database is not running, the step B3 is executed.

In the step B3, according to the task configuration, the server side mounts the storage unit to the Oracle production environment through the mounting link to obtain a mounted storage unit.

In the step B4, according to the task configuration, a password file is created, a parameter file is generated or modified in sequence, and then data recovery is performed based on the RMAN tool.

In the step B5, after the data recovery is completed, the recovery result is checked, and in a case where the data recovery is successful, the step B6 is executed, and in a case where the data recovery fails, the step B7 is executed.

In the step B6, the database is opened and the data recovery process is ended.

In the step B7, the current database is shut down, then the mounted storage unit is demounted, a cleanup operation is performed, and finally the data recovery process is ended.

In the scenario of data backup, the storages of the server side of the backup software are mounted to the Oracle production environment that requires data protection, then the mounted storages are formatted, and related subdirectories are created on these mounted storages. The production data in the Oracle database instance are backed up in an image copy manner by the RMAN into the above subdirectories of the mounted storages, and the corresponding mounted storages are demounted after the backing up is completed, so as to achieve backup protection for the data in the Oracle database.

In the scenario of disaster data recovery, the storages containing the backed-up data of the server side of the backup software are mounted to the Oracle production environment that requires data recovery, a specific recovery script is executed through the RMAN, and the data files (that is, the data to be recovered) are quickly switched to the image copy in the mounted storages to rapidly pull up the business data.

Specifically, the server side is a console of the backup software, and the console is a management unit of the backup software, and is responsible for the task of interacting with users. Managing all resources in the server includes managing the storages and managing the agent client sides. The server sends an instruction of the backup task to a corresponding agent client side, and also, receives an execution result returned by the agent client side, and monitors the execution of the task.

The agent client side is installed on the Oracle production environment. As an agent of the backup software in the production environment, the agent client side is responsible for interacting with the server, receiving instructions issued by the server, processing correspondingly according to the instructions, and returning the execution results to the server.

The storages of the server side (that is, the storage unit 11) can be mounted to the Oracle production environment through an iSCSI link or FC link (not limited to these two methods), and then storage formatting operations are performed on the mounted storages, and according to different Oracle database construction modes on the production environment, the mounted storages can be formatted into a file system storage format or an ASM storage format.

The production data in the Oracle database instance are backed up by the backup and recovery management tool RMAN provided by the Oracle and are outputted by the RMAN to the storages mounted of the server side. The backup manner used is the image copy, and the full backup is to back up a parameter file, a control file, data files, and an archive log file. The incremental backup is to back up incremental data, the control file and the archive log file. The archive log backup is to back up the control file and the archive log file.

Optionally, the performing data backup based on the RMAN tool includes as follows.

The RMAN tool acquires data to be backed up from a database.

Through using the image copy manner, the RMAN tool transfers the data to be backed up to a mounted storage unit.

The Mounted storage unit synchronously shares received data to be backed up to a storage unit.

Optionally, the data to be backed up includes full backup data, incremental backup data and archive log backup data, the full backup data include a parameter file, a control file, data files and an archive log file, and the incremental backup data include incremental data, the control file and the archive log file, the archive log backup data include the control file and the archive log file.

When mounting and recovering, the storages of the server side are mounted to the machine of the data recovery destination (including the Oracle database environment) side, and then specific scripts are executed by using the RMAN tool to perform recovery operations.

The above system and method are applied to practice, when the protected production environment are required to achieve minute-level recovery effect, a backup task may be deployed, and in the task, an Oracle production environment is required. When a user initiates a task, the following steps will be followed:

The process of the data backup task is as follows.

In a step 1, a user selects a data source and object to be protected, and creates a backup task, at this time, the server side will generate corresponding storage volumes according to the configuration of the task, create volume mappings, and grant a permission to access the storage volumes to the agent client side. A task is initiated and a next step is executed, practically, when the task is initiated, it will include detailed database state check, storage link and storage device file check, backup data check and other operations.

In a step 2, after the task is started, the agent client side detects whether the production environment meets the requirements for operation of the software according to options when the task is being created, and if the state of the production environment is normal, a step 3 is executed, and if the state of the production environment is abnormal, the task is ended.

Exemplarily, the implementation process of the above step 2 is as follows: first, the agent client side checks whether the state of a database of an instance to be protected is Open, and if the state of the database of the instance to be protected is not Open, the task is ended; and if the state of the database of the instance to be protected is Open, the agent client side checks whether the mode of the database of the instance to be protected is an archive mode, and if the mode of the database of the protected instance is not the archive mode, the task is ended; and if the mode of the database is the archive mode, the step 3 is executed.

In the step 3, according to the configuration of the task, the storages of the server side are mounted.

In a step 4, formatting operation is performed on the above mounted storages.

In a step 5, according to the configuration of the task, a specific RMAN script is written and executed, in the script, the destinations of data storage are specified to be in the above mounted storages.

In a step 6, the mounted storages of the server side are demounted.

In a step 7, a cleanup operation is performed, and the cleanup operation mainly includes cleaning up a local storage block device of the agent client side, cleaning up local related configuration files, cleaning up temporary files, etc.

In a step 8, the entire backup process is ended.

The process of the mounting and recovery task is as follows.

In a step 1, a user selects point-in-time data to be mounted and recovered and recovery destinations, creates a mounting and recovery task, and at this time, the server side will create volume mappings for corresponding storage volumes according to the configuration of the task, and grant a permission to access the storage volumes to an agent client side. A task is initiated and a next step is executed.

In a step 2, after the task is started, the agent client side checks whether the production environment meets the requirements for operation of the software according to options when the task is being created, and if the instance specified by the mounting task is in an Open state, the task is ended in order not to destroy the running data, and if the instance specified by the mounting task is not in the Open state, a step 3 is executed.

In the step 3, the storages of the server side are mounted

In a step 4, a password file is created according to the configuration specified by the task.

In a step 5, a parameter file is created and modified as follows according to the configuration of the task.

If the task specifies to mount as a new instance, it is necessary to generate new parameter file contents and create a corresponding Spfile according to the task configuration and with reference to the parameter file in the backed-up data.

If the task specifies to perform browsing recovery on the original instance, this step is not required to perform.

In a step 6, according to the configuration of the task, a specific RMAN script is written and executed as follows.

The RMAN script contains the Catalog statement to register the image copy in the storages into the control file.

If the task specifies to mount as a new instance, in the script, the data files are specified through a Switch instruction as image copy in the ASM disk group, and then the Recover operation is executed.

If the task specifies to perform browsing recovery on the original instance, the Restore operation will be performed first, and then the Recover operation will be performed.

In a step 7, after the recovery by the RMAN tool is completed, the recovery result is checked as follows.

If the recovery is successful, step 8 is executed.

If the recovery fails, step 9 is executed.

In a step 8, the database is opened, and step 12 is executed.

In a step 9, the current database instance is shut down.

In a step 10, the storages of the server side are unloaded.

In a step 11, a cleanup operation is performed.

In a step 12, the entire task process is over.

Being mounted and recovered as a new stand-alone instance is taken as an example, after the mounting and recovering are completed, a new instance runs on the storages mounted on the server side, and the user can perform data relocation operations according to practical business requirements. The user can also choose to perform browsing recovery operations on the original instance.

It can be seen that in practical applications, the server side and the agent client side in the Oracle production environment are required to be in the same network and must have permissions to access each other. The user must have a permission to manage the agent client side. When to back up Oracle production data, the database instance must be in the Open state and the database needs to be in the archive mode.

To sum up, this application adopts the method of image copy based on using the RMAN tool to protect data in the Oracle production environment, which significantly shortens the time for disaster recovery of Oracle business data. By mounting the storages to the production environment and performing formatting operations (file system format or ASM format), and then adopting the backup manner of image copy by using the RMAN tool, the Oracle production environment data are backed up to the mounted storage. During disaster recovery, the storages containing the backed-up data are mounted to the data recovery destination (an environment including the Oracle database), the relevant configuration is modified, and the Switch statements are used to rapidly switch the data files to the image copies in the mounted storages, so as to quickly pull up the business data, thereby ensuring the possible shortest downtime of the production environment. Through the technical scheme proposed in this application, the following effects can be achieved.

1. By mounting the storages of the server side to the production environment as the destinations of storage of backed-up data, and when to backup using the RMAN, the data can be directly written into these storages, thereby avoiding the use of media management library (MML) provided by a third party, and chunked transfer of the backed-up data, effectively guaranteeing the integrity of the data at the data transfer level.

2. The storages mounted of the server side can be formatted according to the Oracle database mode. For example, in a stand-alone mode of Oracle, the storages are formatted into a file system storage format. For example, in a Rac cluster mode, the storages can be formatted into the ASM storage format by creating an ASM disk group.

3. The data backed up by using the image copy manner through the RMAN tool ensures the original formats of the data files, and there is no need to consider the file format issue. Each file is a file copy in the original format, which increases the operational flexibility for data recovery.

4. Full backup is performed for the first time, followed by incremental backup permanently. In the storage of the server side, only one golden copy is kept, and each time the backup task ends, a snapshot operation is performed on the storages to generate a snapshot at the current point in time. The incrementally backed-up data are merged into the golden copy through the RAMN, and then the snapshot operation is performed again to generate a new point in time. The management of the backed-up data is transformed into the management of point-in-time snapshots, which significantly reduces storage consumption.

5. When to mount and recover, the storages of the server side are mounted to a target machine of the data recovery, and then the backed-up data in the storages can be accessed. The backed-up data can be mounted as a brand new instance, or can be browsing recovered to the original instance depending on requirements.

6. When the backed-up data are mounted and recovered to a brand new instance, it is simply required to partially modify the parameter file, specify a new instance name and a new control file location, then start the instance to a mounted state, and use the RMAN to switch the data files to the image copies, and then combine with the recover operation, the new instance may just be pulled up quickly.

7. When to recover data, it supports a specified point-in-time recovery, and supports a specified system-change-number (SCN) recovery.

What is claimed is:

1. A backup and recovery method for a database using a backup and recovery system, the backup and recovery method for a database using a backup and recovery system wherein the backup and recovery system comprises a server side, an agent client side and a production environment, wherein the agent client side is connected to the server side, and the agent client side is installed in the production environment, the production environment is internally provided with a database and a recovery manager (RMAN) tool connected sequentially, a storage unit is connected to the server side, and the server side is configured to control a working state of the storage unit, to send a backup task instruction or a recovery task instruction to the agent client side, and to receive an execution result returned by the agent client side; the agent client side is configured to execute corresponding processing on the production environment according to the backup task instruction or the recovery task instruction sent by the server side, and return an execution result to the server side; and the storage unit is connected to the RMAN tool through a corresponding mounted storage unit, and the mounted storage unit is configured to store an image copy of data backup or an image copy of data recovery; wherein the backup and recovery method comprises a data backup process and a data recovery process; wherein, the data backup process comprises: creating, by a user, a backup task, and sending, by the server side, a backup task instruction to the agent client side according to a task configuration of the backup task; detecting, by the agent client side, a state of the database; in response to that the state of the database is detected to be normal, and according to the task configuration, mounting, by the server side, a storage unit to the production environment through a mounting link to obtain a mounted storage unit; and in response to that the state of the database is detected to be abnormal, ending the task; performing a storage formatting operation on the mounted storage unit; performing data backup based on a RMAN tool; demounting the mounted storage unit; and performing a cleanup operation to end the backup process; and wherein, the data recovery process comprises: creating, by a user, a recovery task, and sending, by the server side, a recovery task instruction to the agent client side according to a task configuration of the recovery task; detecting, by the agent client side, whether the database is running, and in response to that the database is running, ending the task, and in response to that the database is not running, and according to the task configuration, mounting, by the server side, a storage unit to the production environment through a mounting link to obtain a mounted storage unit; according to the task configuration, creating a password file, generating or modifying a parameter file in sequence, and performing data recovery based on the RMAN tool; and after the data recovery is completed, checking a recovery result, and in response to a checking result that the data recovery is successful, opening the database, and ending the data recovery process, and in response to a checking result that the data recovery is unsuccessful, shutting down the current database, then demounting the mounted storage unit, performing a cleanup operation, and ending the data recovery process.

2. The method according to claim 1, wherein, the detecting, by the agent client side, a state of the database, and in response to that the state of the database is detected to be normal, and according to the task configuration, mounting, by the server side, a storage unit to the production environment through a mounting link to obtain a mounted storage unit; and in response to that the state of the database is detected to be abnormal, ending the task, comprises: checking, by the agent client side, whether a state of a database of an instance to be protected is Open, and in response to that the state of the database of the instance to be protected is not Open, ending the task; and in response to that the state of the database of the instance to be protected is Open, checking, by the agent client side, whether a mode of the database of the instance to be protected is an archive mode, and in response to that the mode of the database of the instance to be protected is a non-archive mode, ending the task, and in response to that the mode of the database of the instance to be protected is the archive mode, and according to the task configuration, mounting, by the server side, the storage unit to the production environment through the mounting link to obtain a mounted storage unit.

3. The method according to claim 1, wherein, the detecting, by the agent client side, whether the database is running, and in response to that the database is running, ending the task, and in response to that the database is not running, and according to the task configuration, mounting, by the server side, a storage unit to the production environment through a mounting link to obtain a mounted storage unit, comprises: checking, by the agent client side, whether the database state is Open, and in response to that the database state is Open, which indicates that the database is running, ending the task; and in response to that the database state is not Open, and according to the task configuration, mounting, by the server side, the storage unit to the production environment through a mounting link to obtain a mounted storage unit.

4. The method according to claim 1, wherein the storage formatting operation is to format the mounted storage unit into a file system storage format or an automatic storage management (ASM) storage format according to different database construction modes.

5. The method according to claim 1, wherein the performing data backup based on an RMAN tool comprises: acquiring, by the RMAN tool, data to be backed up from the database; through using an image copy manner, transferring, by the RMAN tool, the data to be backed up to the mounted storage unit; and synchronously sharing, by the mounted storage unit, received data to be backed up, to a storage unit.

6. The method according to claim 5, wherein the data to be backed up comprise full backup data, incremental backup data and archive log backup data, the full backup data comprise a parameter file, a control file, data files and an archive log file, the incremental backup data comprise incremental data, the control file and the archive log file, and the archive log backup data comprise the control file and the archive log file.

7. The method according to claim 6, wherein, the according to the task configuration, creating a password file, generating or modifying a parameter file in sequence, and performing data recovery based on the RMAN tool, comprises:

according to the task configuration, creating a password file; in response to a task which instructs to mount as a new instance, and according to the task configuration and the parameter file in the data to be recovered, generating a new parameter file, and in response to a task which instructs to perform browsing recovery based on an original instance, neither generating a new parameter file nor modifying the parameter file; and based on the RMAN tool, first registering the image copy in the storage unit into the control file, and in response to a task which instructs to mount as a new instance, rapidly switching the data to be recovered to the image copy in the mounted storage unit, and performing a Recover operation, and in response to a task which instructs to perform browsing recovery on the original instance, performing a Restore operation first and performing the Recover operation.

\* \* \* \* \*